United States Patent [19]

Wilhelm

[11] 4,429,579
[45] Feb. 7, 1984

[54] TIE ROD TENSION SENSOR

[75] Inventor: Donald F. Wilhelm, Maumee, Ohio

[73] Assignee: Helm Instrument Co., Inc., Maumee, Ohio

[21] Appl. No.: 314,987

[22] Filed: Oct. 26, 1981

[51] Int. Cl.³ .......................... G01B 7/18; G01L 1/22
[52] U.S. Cl. ......................................... 73/768; 73/761; 73/862.65
[58] Field of Search ..................... 73/761, 768, 862.54, 73/862.65

[56] References Cited

U.S. PATENT DOCUMENTS

| | | | |
|---|---|---|---|
| 2,925,576 | 2/1960 | Wakeland et al. | 73/761 X |
| 3,297,971 | 1/1967 | Gindes | 73/862.65 X |
| 3,389,459 | 6/1968 | Russell | 73/768 X |
| 4,135,392 | 1/1979 | Young | 73/862.54 X |

FOREIGN PATENT DOCUMENTS

2424487 11/1975 Fed. Rep. of Germany ... 73/862.65

Primary Examiner—Charles A. Ruehl
Assistant Examiner—Brian Tumm
Attorney, Agent, or Firm—Wilson, Fraser, Barker & Clemens

[57] ABSTRACT

A tie rod load sensor for a die-casting or other machine includes an axially-extending bore formed in the tie rod to receive a strain gauged sensing member. One end of the sensing member is countersunk to receive a ball which concentrates the load when it is forced against the bottom of the bore by a bolt threaded into the opening of the bore. The sensing member includes a narrow central shaft portion upon which a plurality of strain gauges are mounted. The bolt is utilized to pre-load the sensing member such that the strain gauges mounted thereon will measure changes in the tension of the tie rod.

7 Claims, 2 Drawing Figures

TIE ROD TENSION SENSOR

BACKGROUND OF THE INVENTION

1. Field of the Invention

The present invention relates in general to force-sensitive transducers and in particular to a load sensor for measuring the tension level on cylindrical rods used as tie rods in a die-casting or other machine.

2. Description of the Prior Art

The ability to measure force or load is a vital part of many industrial processes. Recognizing that a structure undergoes dimensional changes when subjected to a load, a measure of the dimensional change in a structure can accurately indicate the amount of force applied thereto. Such measurement is usually made through the use of a wire, foil, or semiconductor element intimately bonded to the structure. By measuring the change in the electrical resistance of the element, which resistance is a function of the change in cross section of the element due to alterations in the dimensions of a structure, it is possible to accurately measure the load applied to the structure.

Many transducer devices have been developed for attachment to structures for measuring the amount of stress applied thereto. U.S. Pat. No. 3,210,993 to Shoor et al. discloses an electro-mechanical transducer including a cylindrical force sensing element and a plurality of bolts which are utilized to pre-load the force sensing element. U.S. Pat. No. 3,388,590 to Dryden discloses a strain sensing transducer attached to the connector pin positioned within a female connector receptacle. The strain produced by the pin biasing means in the wall of the receptacle is sensed by the transducer and the resulting electrical signal produced is a measure of the quality of the electrical connection between the pin and the receptacle.

U.S. Pat. No. 3,389,459 to Russell discloses a strain gauge ring for a pressure transducer. The strain gauge is installed in a groove cut in the surface of a force ring and the ring is mechanically deformed adjacent the gauge to elongate the gauge and lock the same within the groove. A ball is used in a countersink to concentrate the load at one end of the sensor. A retainer ring can be utilized to pre-load the sensor. U.S. Pat. No. 3,742,757 to Callahan discloses a load cell for measuring stresses in pre-stressed concrete. Stress forces are applied to opposite sides of the cell, whereby a deflection of a pre-stressed internal member is proportional to the applied stress. Any changes are detected by variations in the output of the strain gauges attached to the internal member.

SUMMARY OF THE INVENTION

The present invention relates to a load sensor for measuring the tension level on rods, such as cylindrical tie rods used in plastic injection molding machines, die-casting machines, hydraulic presses, and the like. An axially-extending bore is formed in the tie rod to receive a strain gauged sensing member. The leading end of the strain gauged member is countersunk to receive a ball which concentrates the load when it is forced against the bottom of the bore by a bolt threaded into the opening of the bore. The member includes a narrow central shaft portion upon which a plurality of strain gauges are mounted. The bolt is utilized to load the strain gauged member to a predetermined initial compression level. The strain gauges will measure the amount of the tension applied to the tie rod as a decrease in the amount of pre-loaded compression.

It is an object of the present invention to provide an electro-mechanical transducer capable of being attached to a tie rod structure for measuring the amount of tension therein.

It is another object of the present invention to provide a load sensor which can be installed easily and reliably in a tie rod.

It is a further object of the present invention to provide a tie rod load sensor which is simple and inexpensive in construction.

Other objects and advantages of the present invention will become apparent to those skilled in the art from the following detailed description of the preferred embodiment of the invention, when read in light of the accompanying drawings.

DETAILED DESCRIPTION OF THE PREFERRED EMBODIMENT

Figure 1:
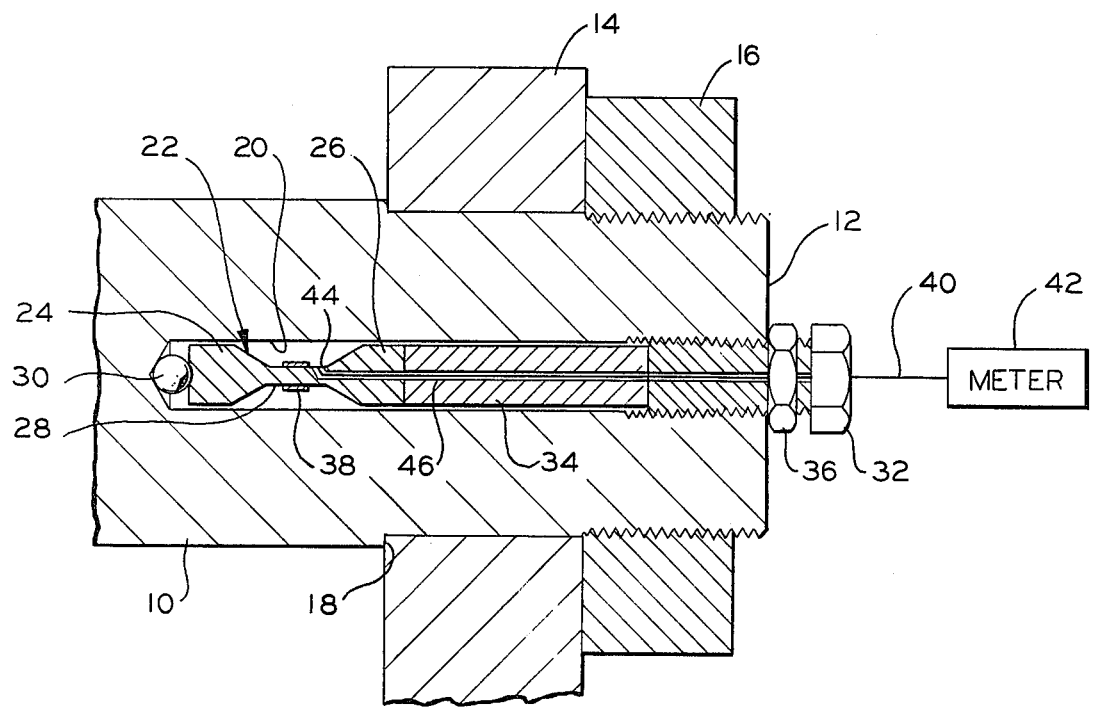
FIG. 1 is a sectional elevational view of a portion of a machine utilizing a tie rod load sensor in accordance with the present invention.

Referring now to the drawings, there is illustrated in FIG. 1 a tension sensor for a machine tie rod 10 in accordance with the present invention. The tie rod 10 includes a threaded end portion 12 which extends through an aperture formed in a back plate 14 into cooperation with a jamb nut 16 to releasably secure the tie rod 10 to the back plate 14. The end portion 12 of the tie rod 10 can be formed smaller in diameter than the rest of the tie rod 10 so as to create a shoulder 18 which firmly abuts the back plate 14. The back plate 14 is utilized to provide a stable reference point against which the amount of tension applied to the tie rod 10 can be measured. Thus, the back plate 14 can be any part of the machine which is stationary with respect to the tie rod 10.

Figure 2:
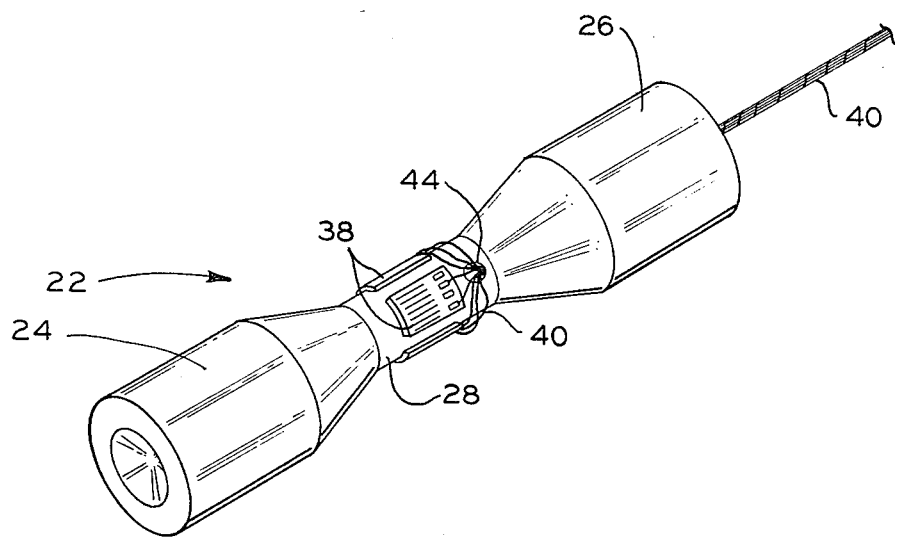
FIG. 2 is an enlarged perspective view of the sensing member of the tie rod load sensor of FIG. 1.

An elongated axially-extending bore 20 is formed in the tie rod 10 to receive a strain gauged sensing member 22. As shown most clearly in FIG. 2, the sensing member 22 includes two enlarged end portions 24 and 26, both of which taper inwardly to a narrower central shaft portion 28. The outer end of the portion 24 of the sensing member 22 is countersunk to receive a ball 30 which will contact the closed end of the bore 20. The ball 30 is adapted to concentrate the forces applied by the tie rod 10 onto the sensing member 22. A bolt 32 threaded into the open end of the bore 20 compresses the sensing member 22 against the closed end of the bore 20. A spacer 34 can be inserted to fill the gap between the bolt 32 and the sensing member 22. The spacer 34 will adapt the sensing member 22 to bores of varying length formed in tie rods of different sizes. The bolt 32 is utilized to load the sensing member 22 to a predetermined initial level of compression. A lock nut 36 is provided to secure the bolt 32 in a desired position and maintain an accurate pre-loading of the sensing member 22.

A plurality of conventional strain gauges 38 are attached to the central shaft 28 of the sensing member 22. Although any number of strain gauges 38 can be used, it has been found desirable to attach four gauges 38 to the sensing member 22 spaced apart from each other by 90°. Each gauge 38 is electrically connected in a bridge circuit over a pair of wires 40 to an external meter 42. The meter 42 is sensitive to the change in resistivity of the gauges 38 caused by the change in stress applied to the sensing member 22. The wires 40 extend through an aperture 44 formed in the central shaft 28 down to a hollow passage 46 which extends through the other end 26 of the sensing member 22. Similar passages are formed in the spacer 34 and the bolt 32 to allow the wires 40 to extend through to the meter 42.

To utilize the tie rod load sensor, the bore 20 is first drilled in the tie rod 10. Because the bore 20 is axially aligned within the tie rod 10 and relatively small with respect thereto, the strength of the tie rod 10 is not substantially impaired. The ball 30 is first inserted into the bore 20, followed by the sensing member 22, the appropriately sized spacer 34, and the lock nut 34 and bolt 32. By tightening the bolt 32, the sensing member 22 is compressed to a predetermined level. When the tie rod 10 is placed in tension, the strain gauges 38 mounted on the sensing member 22 will detect a decrease in the amount of pre-loaded compression. Such a decrease is proportional to the amount of tension applied to the tie rod 10. By properly calibrating the meter 42, an accurate measure of the tension on the tie rod 10 can be obtained.

In accordance with the provisions of the patent statutes, the principle and mode of operation of the present invention have been explained and illustrated in its preferred embodiment. However, it must be understood that the invention can be practiced otherwise than as specifically explained and illustrated without departing from its spirit or scope.

What is claimed is:

1. A load sensor for measuring the tension forces applied to a rod, the rod having an elongated axially-extending bore formed in one end thereof, comprising:
    a ball adapted to be inserted in the bore for contacting a closed end thereof;
    a sensing member adapted to be inserted in the bore having two end portions each tapering towards a narrower central shaft portion between said end portions, one of said end portions being countersunk to receive a portion of said ball;
    strain gauge means attached to said central shaft portion for measuring the amount of force applied thereto;
    a spacer adapted to be inserted in the bore for contacting the other of said end portions of said sensing member; and
    pre-loading means engageable with the rod and said spacer for compressing said sensing member by a predetermined amount, whereby the tension applied to the rod will be measured as a decrease in the pre-loaded compression force applied to said sensing member.

2. A load sensor in accordance with claim 1 wherein said strain gauge means includes a plurality of strain gauges attached to the periphery of said central shaft.

3. A load sensor in accordance with claim 2 wherein said sensing member, said spacer, and said pre-loading means include passage means formed therein for allowing said strain gauges to be electrically connected to an external meter by a plurality of wires.

4. A load sensor in accordance with claim 1 wherein said pre-loading means includes a bolt threadably secured in the open end of the bore for contacting said spacer.

5. A method of measuring the tension forces applied to a rod including the steps of:
    a. forming an elongated axially-extending bore in one end of the rod;
    b. inserting a sensing member into the bore, said sensing member including strain gauge means for measuring the amount of force applied thereto;
    c. inserting a spacer into the bore so as to contact said sensing member;
    d. inserting a pre-loading means into the bore and compressing said sensing member and said spacer by a predetermined amount; and
    e. measuring the tension applied to the rod as a change in resistivity of said strain gauge means indicating a decrease in the pre-loaded compression force applied to said sensing member.

6. A method of measuring tension forces in accordance with claim 5 further including the step of inserting a ball into the bore before said inserting of a sensing member into the bore.

7. A method in accordance with claim 5 wherein step d. is performed by threading a bolt into the bore to apply pressure to said sensing means.

* * * * *